United States Patent
Ohse et al.

(10) Patent No.: US 11,525,744 B2
(45) Date of Patent: Dec. 13, 2022

(54) SENSOR SYSTEM AND INTEGRATED HEATER-SENSOR FOR MEASURING AND CONTROLLING PERFORMANCE OF A HEATER SYSTEM

(71) Applicant: Watlow Electric Manufacturing Company, St. Louis, MO (US)

(72) Inventors: Jeremy Ohse, St. Louis, MO (US); Louis P. Steinhauser, St. Louis, MO (US); Mark Everly, St. Charles, MO (US); Brett Bradshaw, St. Louis, MO (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 1111 days.

(21) Appl. No.: 16/047,702

(22) Filed: Jul. 27, 2018

(65) Prior Publication Data
US 2019/0032958 A1    Jan. 31, 2019

Related U.S. Application Data

(60) Provisional application No. 62/537,922, filed on Jul. 27, 2017.

(51) Int. Cl.
*G01K 13/00*    (2021.01)
*H05B 3/48*    (2006.01)
(Continued)

(52) U.S. Cl.
CPC .......... *G01K 13/00* (2013.01); *F24H 9/2021* (2013.01); *G01F 23/22* (2013.01); *G01F 23/246* (2013.01);
(Continued)

(58) Field of Classification Search
CPC ........ G01K 3/00; G01F 23/22; G01F 23/246; G01F 23/248; F24H 9/2021;
(Continued)

(56) References Cited

U.S. PATENT DOCUMENTS 4,785,665 A    11/1988    McCulloch
4,994,780 A    2/1991    McQueen
(Continued)

FOREIGN PATENT DOCUMENTS

CN    104568053 A    4/2015
CN    104575640    4/2015
(Continued)

OTHER PUBLICATIONS

Partial International Search Report for international application PCT/US2018/044119, dated Nov. 14, 2018.
(Continued)

*Primary Examiner* — Elias Desta
(74) *Attorney, Agent, or Firm* — Burris Law, PLLC

(57) ABSTRACT

A fluid sensor system detects one or more performance characteristics of a heating system that heats a fluid. The sensor system includes a probe having a finite length a portion of which is to be immersed in the fluid. The probe includes a resistive heating element and a fluid temperature sensor for measuring one or more performance characteristics, wherein the fluid temperature sensor is configured to measure a fluid temperature, and the resistive heating element is operable as a heater to create a temperature differential between the fluid and air to detect the fluid, and as a sensor to measure a fluid level.

17 Claims, 12 Drawing Sheets

(51) Int. Cl.
*G01F 23/24* (2006.01)
*H05B 3/80* (2006.01)
*H05B 1/02* (2006.01)
*H05B 3/00* (2006.01)
*F24H 9/20* (2022.01)
*G01F 23/22* (2006.01)
*A47J 37/12* (2006.01)

(52) U.S. Cl.
CPC ......... *G01F 23/248* (2013.01); *H05B 1/0269* (2013.01); *H05B 3/0014* (2013.01); *H05B 3/48* (2013.01); *H05B 3/80* (2013.01); *A47J 37/1266* (2013.01)

(58) Field of Classification Search
CPC ...... H05B 1/0269; H05B 3/0014; H05B 3/48; H05B 3/80; A47J 37/1266
See application file for complete search history.

(56) References Cited

U.S. PATENT DOCUMENTS

| | | | |
|---|---|---|---|
| 5,134,772 | A | 8/1992 | McQueen |
| 6,098,457 | A | 8/2000 | Poole |
| 6,202,486 | B1 | 3/2001 | Kemp |
| 7,458,718 | B2 | 12/2008 | Krishnamurthy et al. |
| 7,804,296 | B2 * | 9/2010 | Flaum ................... G01V 3/32 |
| | | | 324/306 |
| 8,978,450 | B2 * | 3/2015 | Steinhauser ............ F01N 3/208 |
| | | | 73/61.76 |
| 2005/0265425 | A1 | 12/2005 | Heldberg |
| 2006/0049163 | A1 | 3/2006 | Gotoh et al. |
| 2008/0025366 | A1 | 1/2008 | McBurney |
| 2012/0186334 | A1 | 7/2012 | Steinhauser |
| 2013/0192352 | A1 | 8/2013 | Lanzani |
| 2016/0353521 | A1 | 12/2016 | Reynolds et al. |

FOREIGN PATENT DOCUMENTS

| | | |
|---|---|---|
| CN | 106768160 | 5/2017 |
| EP | 1145597 A2 | 10/2001 |
| GB | 2168153 | 6/1986 |
| JP | S6039510 | 3/1985 |
| JP | 2002525622 | 8/2002 |
| JP | 2004008253 | 1/2004 |
| JP | 2004044579 | 2/2004 |
| JP | 2004239700 | 8/2004 |
| TW | 529059 | 4/2003 |
| WO | 2000019173 | 4/2000 |

OTHER PUBLICATIONS

Office Action issued in corresponding JP Application No. 2020503943, dated Jun. 14, 2022.
Extended European Search Report and Written Opinion issued in European counterpart Application No. 22170811.8, completed Sep. 9, 2022, 8 pages.

* cited by examiner

SENSOR SYSTEM AND INTEGRATED HEATER-SENSOR FOR MEASURING AND CONTROLLING PERFORMANCE OF A HEATER SYSTEM

CROSS-REFERENCE TO RELATED APPLICATIONS

This application claims the benefit of and priority to U.S. Provisional Patent Application 62/537,922 filed Jul. 27, 2017. The disclosure of this application is incorporated herein by reference.

FIELD

The present disclosure relates to a sensor for measuring characteristics of a heater system.

BACKGROUND

The statements in this section merely provide background information related to the present disclosure and may not constitute prior art.

A heating system, such as a fluid heating system, generally includes a heater that is operable to heat an object (e.g., wafer, liquid, gas, etc) and a control system for controlling the heater. Multiple independent sensors are commonly used to measure different performance characteristics of the heating system. For example, a fluid heating system, such as an electric fryer, may use multiple sensor devices for measuring fluid temperature, ambient temperature, fluid quality, fluid level, etc. The control system receives data from the sensor devices to obtain the performance characteristics, and to ultimately determine the appropriate amount of power to apply to the heater.

With multiple sensor devices, the heater system becomes significantly complex and may only be capable of detecting large incremental changes. These and other issues are addressed by the present disclosure.

SUMMARY

This section provides a general summary of the disclosure, and is not a comprehensive disclosure of its full scope or all of its features.

In one form, the present disclosure is directed toward a fluid sensor system for a heating system. The sensor system includes a probe having a finite length a portion of which is to be immersed in a fluid. The probe comprises a resistive heating element and a fluid temperature sensor for measuring one or more performance characteristics. The fluid temperature sensor is configured to measure a fluid temperature, and the resistive heating element is operable as a heater to create a temperature differential along the length of the probe to detect the fluid, and as a sensor to measure a fluid level.

In another form, the fluid sensor system further includes a control system configured to operate the probe and determine the one or more performance characteristics of the heating system based on at least one of an electrical response of the resistive heating element operating as the sensor and an electrical response of the fluid temperature sensor. The performance characteristics includes at least one of the fluid level and the fluid temperature.

In yet another form, the control system is configured to determine the fluid level based on the fluid temperature, a resistance of the resistive heating element, and predetermined information that correlates a given resistance and a given temperature with a fluid level.

In one form, the control system is configured to apply a first power amount to the resistive heating element to generate the temperature differential when the fluid temperature is substantially same as an ambient temperature, and a second power amount less than the first power amount to measure resistance of the resistive heating element when the fluid temperature is different from the ambient temperature.

In another form, the probe further comprises an ambient temperature sensor to measure the ambient temperature, wherein the ambient temperature sensor is disposed at a portion of the probe that is away from the fluid.

In yet another form, the ambient temperature sensor is a thermocouple.

In one form, the probe further comprises a resistance temperature detector RTD, and at least one of the resistive heating element and the fluid temperature sensor is connected to the RTD.

In another form, the probe further comprises a four-wire resistance temperature detector RTD. A first loop wire having a high temperature coefficient resistance TCR is connected to the RTD to form the resistive heating element and a second loop wire is connected to the RTD to form the fluid temperature sensor.

In yet another form, the probe further comprises a limit sensor for detecting a maximum fluid temperature.

In one form, the fluid temperature sensor is a thermocouple.

In one form, the present disclosure is directed toward a fluid sensor system for a heating system that is operable to heat fluid. The sensor system includes a probe having a finite length a portion of which is to be immersed in the fluid and a control system. The probe comprises a resistive heating element to detect the fluid and a fluid temperature sensor to measure a fluid temperature. The resistive heating element is operable as a heater to create a temperature differential along the length of the probe to detect the fluid, and as a sensor to measure a fluid level. The control system is configured to determine one or more performance characteristics of the heating system based on at least one of an electrical response from the resistive heating element operating as a sensor and an electrical response of the fluid temperature sensor, and on predetermined information. The control system is configured to operate the resistive heating element as a heater in response to the fluid temperature being substantially same as an ambient temperature.

In another form, the control system is configured to apply at least one of a first power amount to the resistive heating element to generate the temperature differential when the fluid temperature is substantially same as the ambient temperature, and a second power amount less than the first power amount to the resistive heating element to measure a resistance of the resistive heating element when the fluid temperature is different from the ambient temperature.

In yet another form, the control system is configured to determine the fluid level, as a performance characteristic, based on the fluid temperature determined based on the electrical response of the fluid temperature sensor, the resistance of the resistive heating element, and predetermined information that correlates a given resistance and a given fluid temperature with a fluid level.

In one form, the probe further comprises an ambient temperature sensor to measure the ambient temperature.

In another form, the probe further includes a resistance temperature detector RTD, and at least one of the resistive heating element and the fluid temperature sensor is connected to the RTD.

In yet another form, the probe further includes a limit sensor for detecting a maximum fluid temperature, and the control system is configured to measure the fluid temperature based on an electrical response of the limit sensor and determine whether the fluid temperature is above a predefined limit.

In one form, the present disclosure is directed toward a heater system having the sensor system, a heater operable to heat the fluid, and a heater control system in communication with the control system of the sensor system and configured to control the heater based on the performance characteristics.

In one form, the present disclosure is directed toward an integrated heater device that includes at least one multiportion resistive element configured to measure one or more performance characteristics. The at least one multiportion resistive element has a first portion defined by a first conductive material and a second portion defined by a second conductive material having a lower temperature coefficient of resistance (TCR) than that of the first conductive material. The multiportion resistive element is operable as a heater to generate heat and a sensor, and the first portion of the multiportion resistive element is configured to extend along a designated area to measure a first performance characteristic.

In another form, the multiportion resistive element includes a first member and a second member having a different Seebeck coefficient than that of the first member. The first member and the second member form a temperature sensing junction to measure a temperature at a first location as a second performance characteristic.

In yet another form, the present disclosure is directed toward a heater system including the integrated heater device and a control system configured to operate the heater device, and more particularly, to operate the multiportion resistive element as the heater to heat an object or as a sensor to measure an electrical response of the multiportion resistive element.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 8:
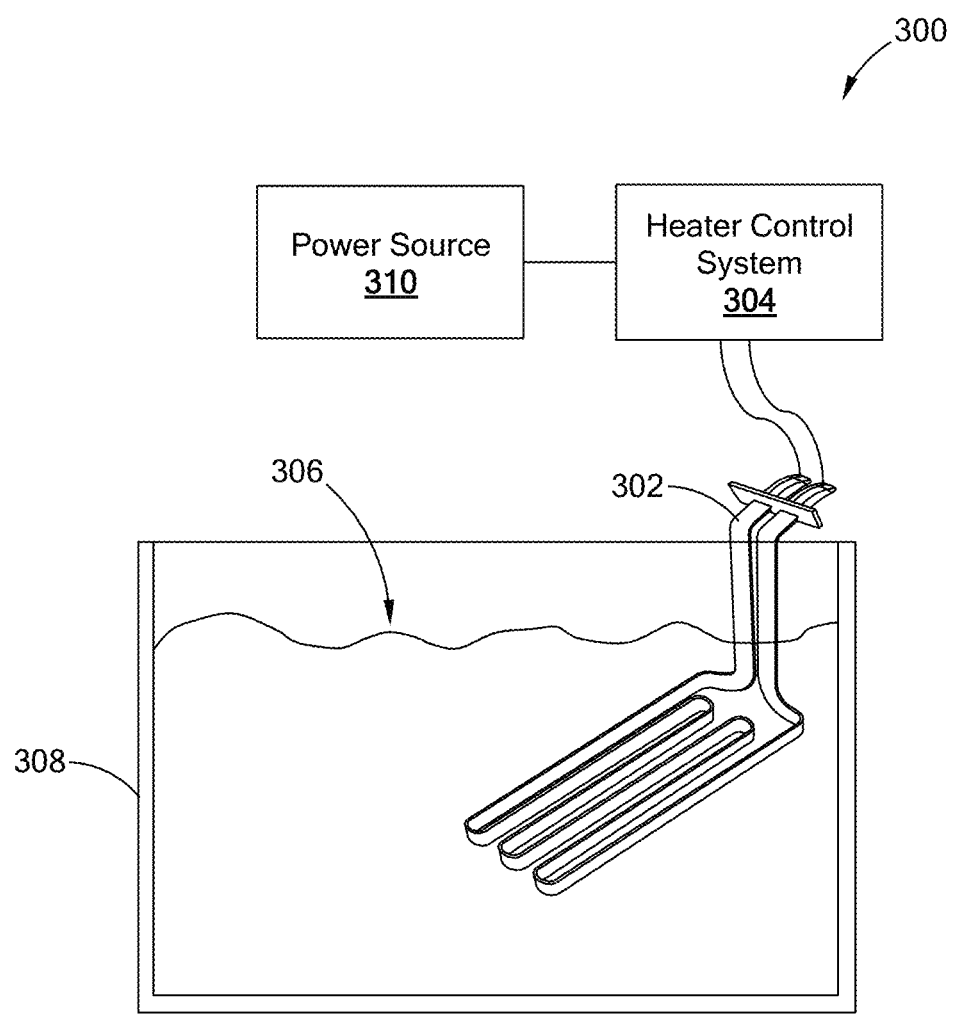
Figure 9:
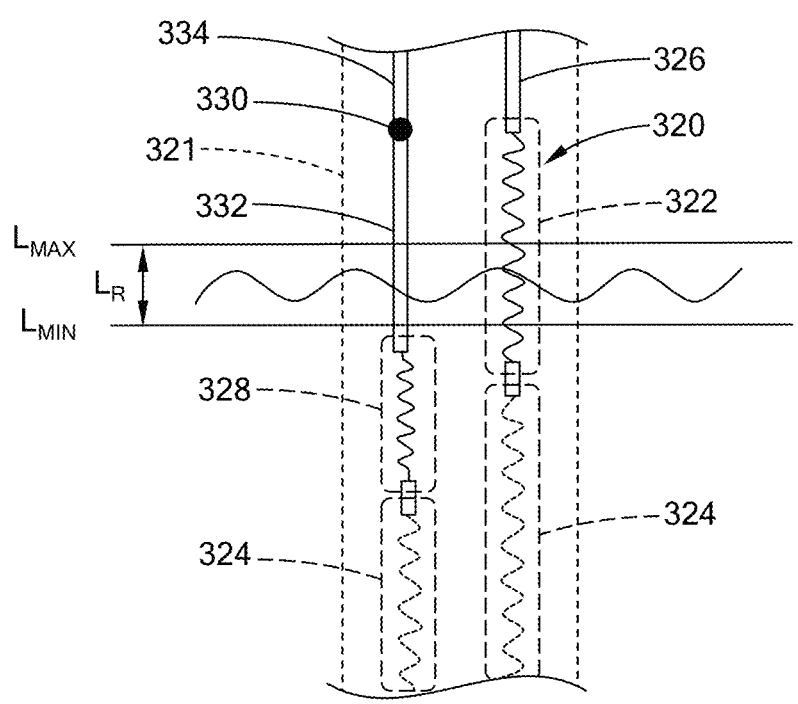
Figure 10:
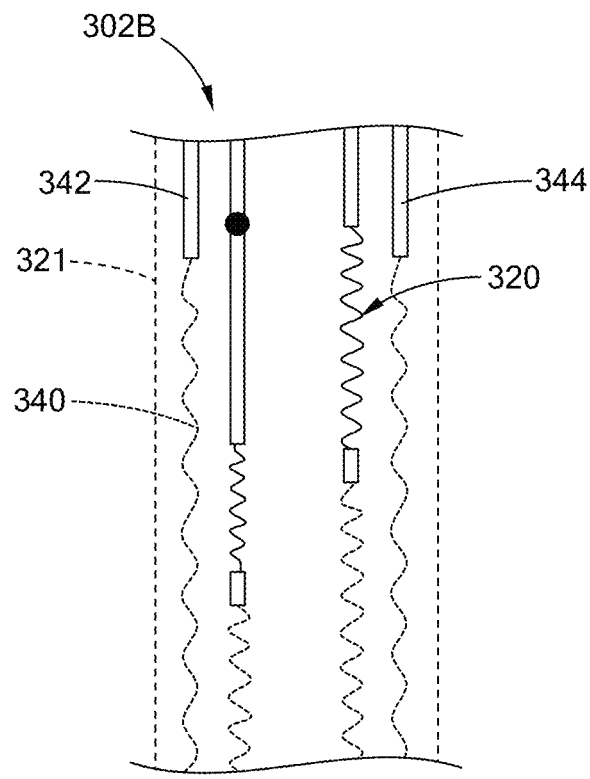
Figure 11:
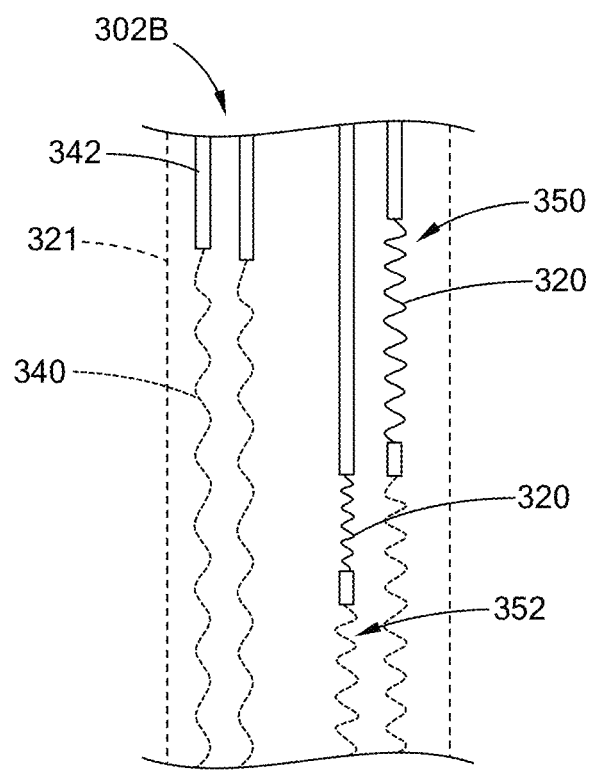
Figure 12:
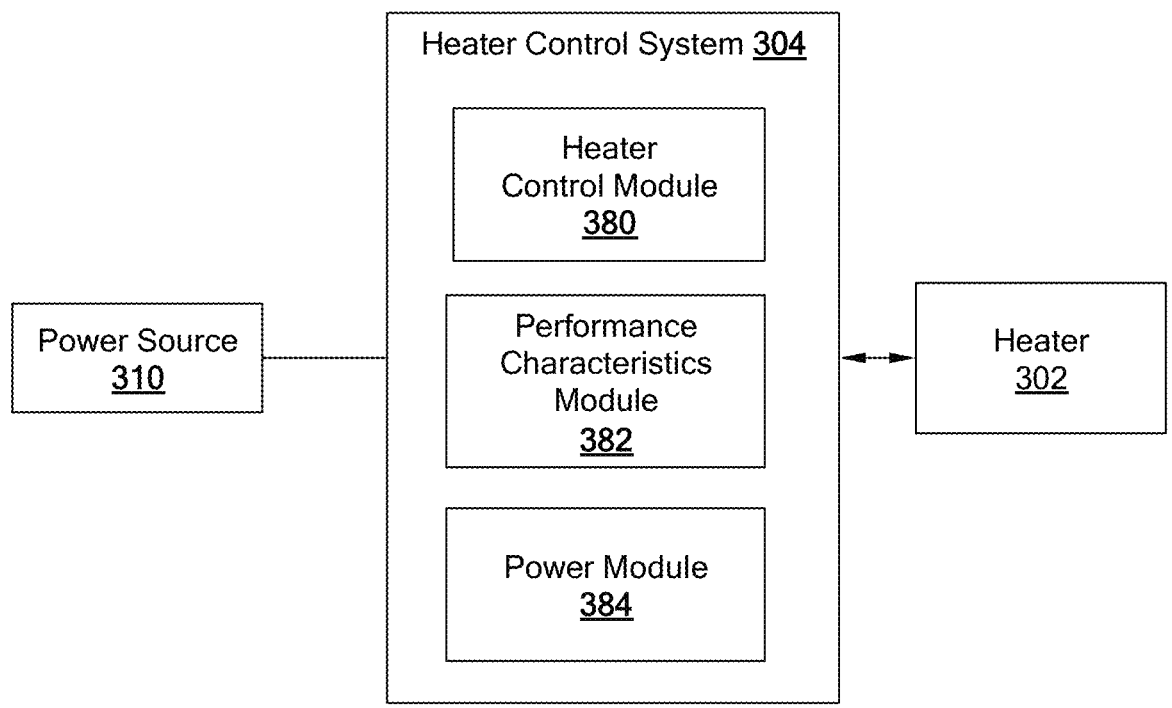

FIGS. 6A, 6B, 6C, and 6D illustrate variations of a probe for the fluid sensor system in accordance with the teachings of the present disclosure;

FIGS. 7A to 7J illustrates additional configuration for a resistive heating element, a fluid temperature sensor, and/or an ambient temperature sensor for a probe of the fluid sensor system in accordance with the teachings of the present disclosure;

FIG. 8 illustrates a heater system having an integrated heater-sensor in accordance with the teachings of the present disclosure;

FIG. 9 is a partial cross-sectional view of the integrated heater-sensor in a first form in accordance with the teachings of the present disclosure;

FIG. 10 is a partial cross-sectional view of the integrated heater-sensor in a second form in accordance with the teachings of the present disclosure;

FIG. 11 is a partial cross-sectional view of the integrated heater-sensor in a third form in accordance with the teachings of the present disclosure; and FIG. 12 is a block diagram of a heater control system of the heater system of FIG. 8.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A heating system for heating, for example, a liquid, generally includes multiple independent sensors for measuring fluid temperature and ambient temperature. In one form, the heating system includes a heater to heat fluid, such as oil or exhaust gas, and a heater control system that controls the operation of the heater based on the measurements from the sensors. In one form, the present disclosure is directed toward a fluid sensor system for measuring multiple performance characteristics of the heater system. The performance characteristics may include, for example, a fluid level, a fluid temperature, an ambient temperature, and/or other suitable information.

Figure 1:
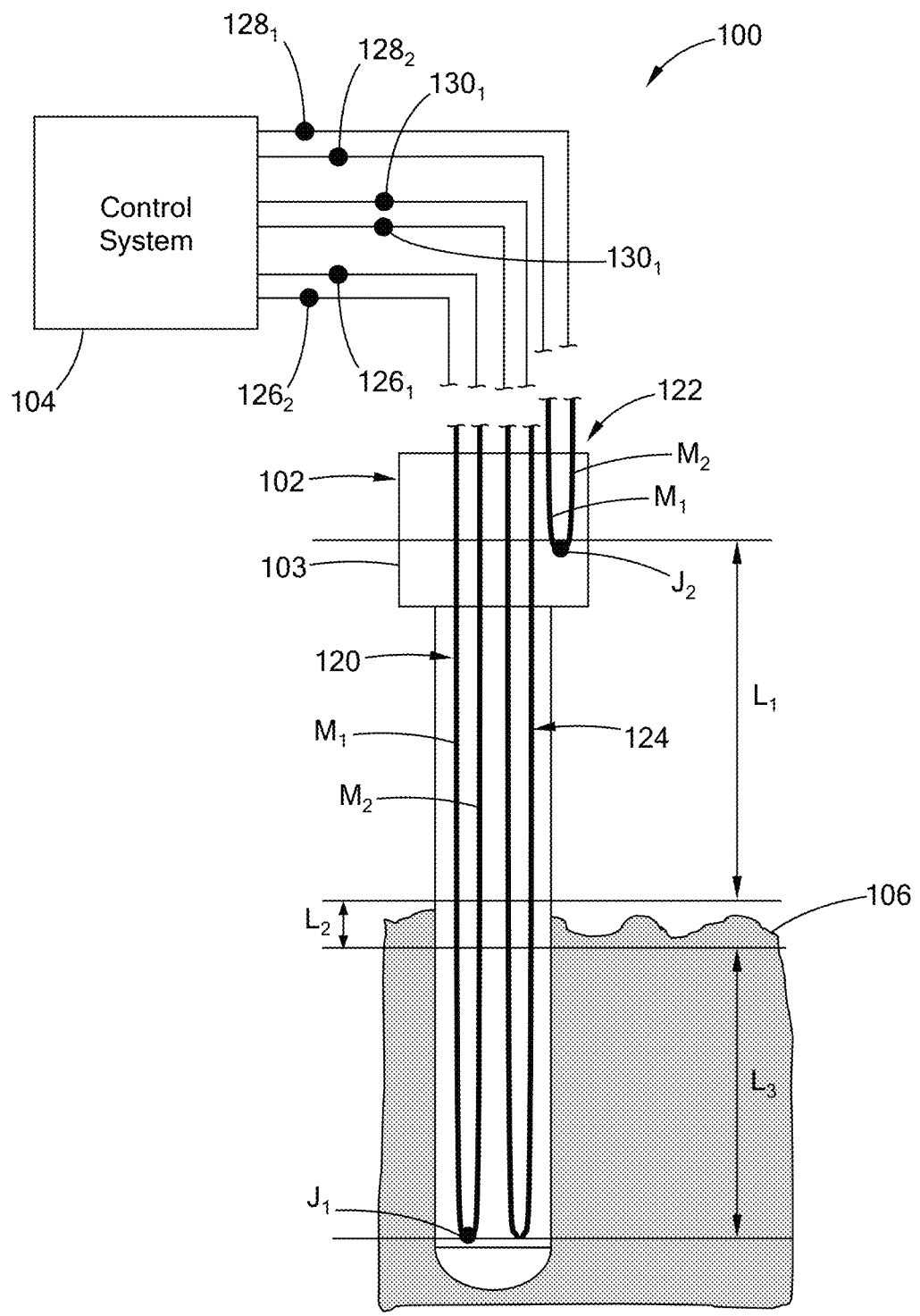
FIG. 1 is a schematic of a fluid sensor system in accordance with the teachings of the present disclosure.
Figure 2:
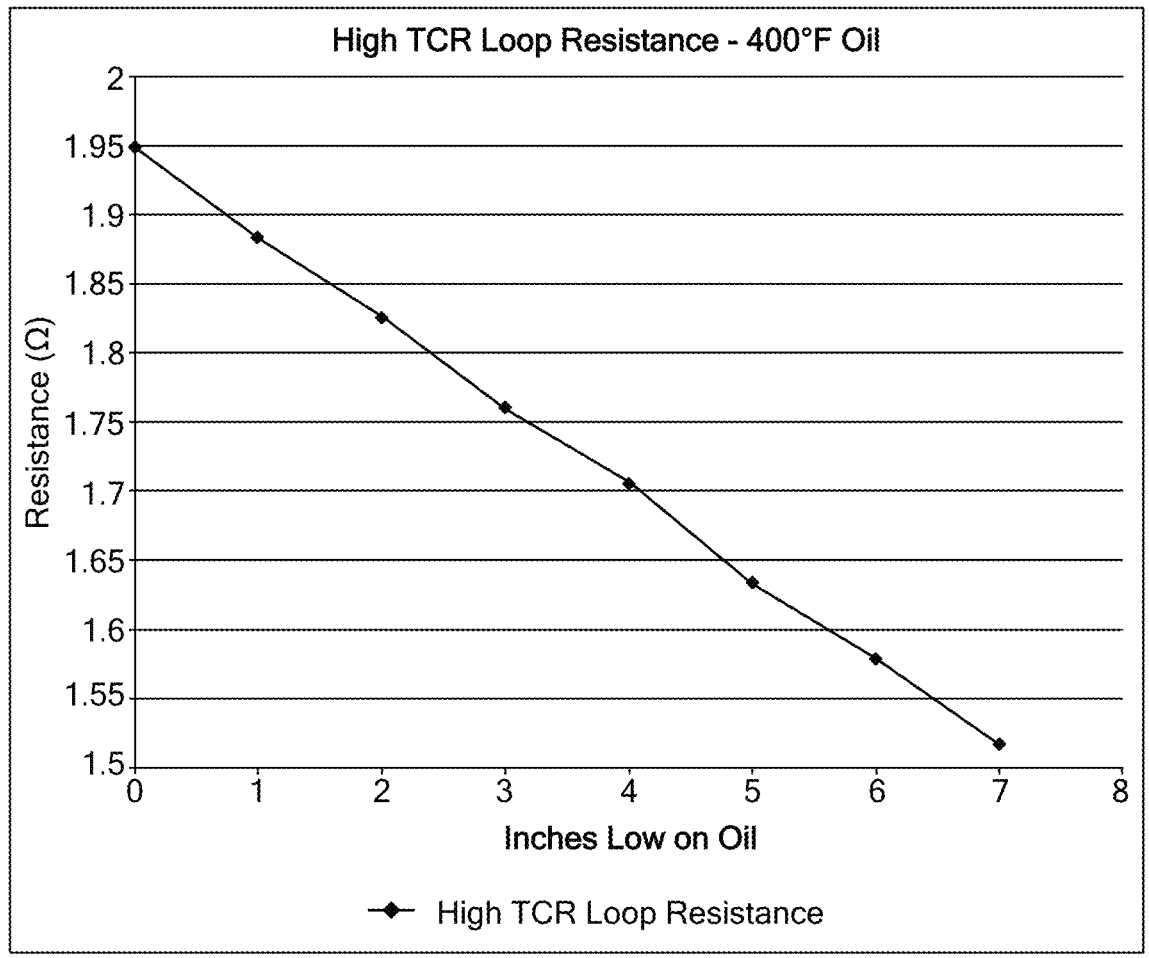
FIG. 2 illustrates functional relationship between resistance, temperature, and fluid level based on the teachings of the present disclosure.

Referring to FIGS. 1 and 2, an example of a fluid sensor system 100 is now described. In one form, the device 100 includes a probe 102 having a sheath 103 of a finite length and a control system 104 electrically coupled to the probe 102. The probe 102 is placed in a fluid 106, such that the probe 102 is partly below and partly above the fluid 106, and the control system 104 is configured to control the operation of the probe 102 to measure the performance characteristics.

The probe 102 includes one or more sensors that extend within the sheath 103. In one form, sheath 103 is made of protective metallic alloys, commonly employing nickel and chromium to prevent corrosion (e.g., stainless steels, INCOLOYS, and INCONELS). In another form, in applications below approximately 260° C., the sensors 120 and 124 may be insulated with plastics and include a thermal fill or potting for improved performance. For applications above approximately 260° C., the sensors 120 and 124 may be held in place and insulated by a ceramic or ceramic powder, commonly compacted MgO. Other suitable constructions for the casing/sheath to hold the sensors 120 and 124 may also be used and are within the scope of the present disclosure. For example, sensing elements 120 and 124 may be made from wire, foil, or thin film and insulated with polyimide, plastics, ceramic, glass or other insulating materials.

The probe 102 includes a fluid temperature sensor 120, an ambient temperature sensor 122, and a resistive heating element 124 for measuring performance characteristics, such as fluid temperature ($T_{FL}$), ambient temperature ($T_{AMB}$), and fluid level (L). In one form, the fluid temperature sensor 120 and the ambient temperature sensor 122 are provided as thermocouples (i.e., a first thermocouple 120 and a second thermocouple 122) for measuring the fluid temperature and the ambient temperature, respectively. As thermocouples, each of the thermocouples 120 and 122 include two wires made of different materials ($M_1$ and $M_2$, in FIG. 1), such as ALUMEL and CHROMEL. The wires are joined together at one end creating junctions $J_1$ and $J_2$, respectively. To measure fluid temperature, junction $J_1$ is positioned along the probe 102 to be submerged in the fluid 106, and to measure ambient temperature, junction $J_2$ is positioned along the probe 102 to be outside of the fluid. The other end of the wires of the thermocouples 120 and 122 are electrically coupled to the control system 104 at terminals $126_1$, $126_2$ (collectively terminals 126) and $128_1$, $128_2$ (collectively terminals 128), respectively. The wires can be electrically coupled to the control system 104 in various suitable ways. For example, the wires may be coupled via power pins, lead wires, directly connected to dedicated ports within the control system 104, and/or other suitable methods.

While specific examples are provided for the type of material used for the thermocouples 120 and 122, other suitable dissimilar materials having different Seebeck coefficients may be used. For example, various combinations of nickel alloys, iron, constantan, Alumel® or the like may be used. In addition, the type of wires used for thermocouple 120 may be different from that of thermocouple 122.

In operation, when the junction $J_1$ of thermocouple 120 undergoes a change in temperature, a voltage change is created and measured by the control system 104 across terminals $126_1$ and $126_2$. Based on the voltage and predetermined data (e.g., reference tables), the control system 104 determines the temperature at the junction $J_1$. The thermocouple 122 operates in a similar as thermocouple 120. The junction $J_1$ of the thermocouple 120 is submerged in fluid 106 to measure the temperature of the fluid 106, and the junction $J_2$ of thermocouple 122 is located above the fluid 106 to measure the ambient temperature. In the following, the thermocouple 120 may be referred to as a fluid thermocouple 120 and the thermocouple 122 may be referred to as an ambient thermocouple 122.

Figure 3:
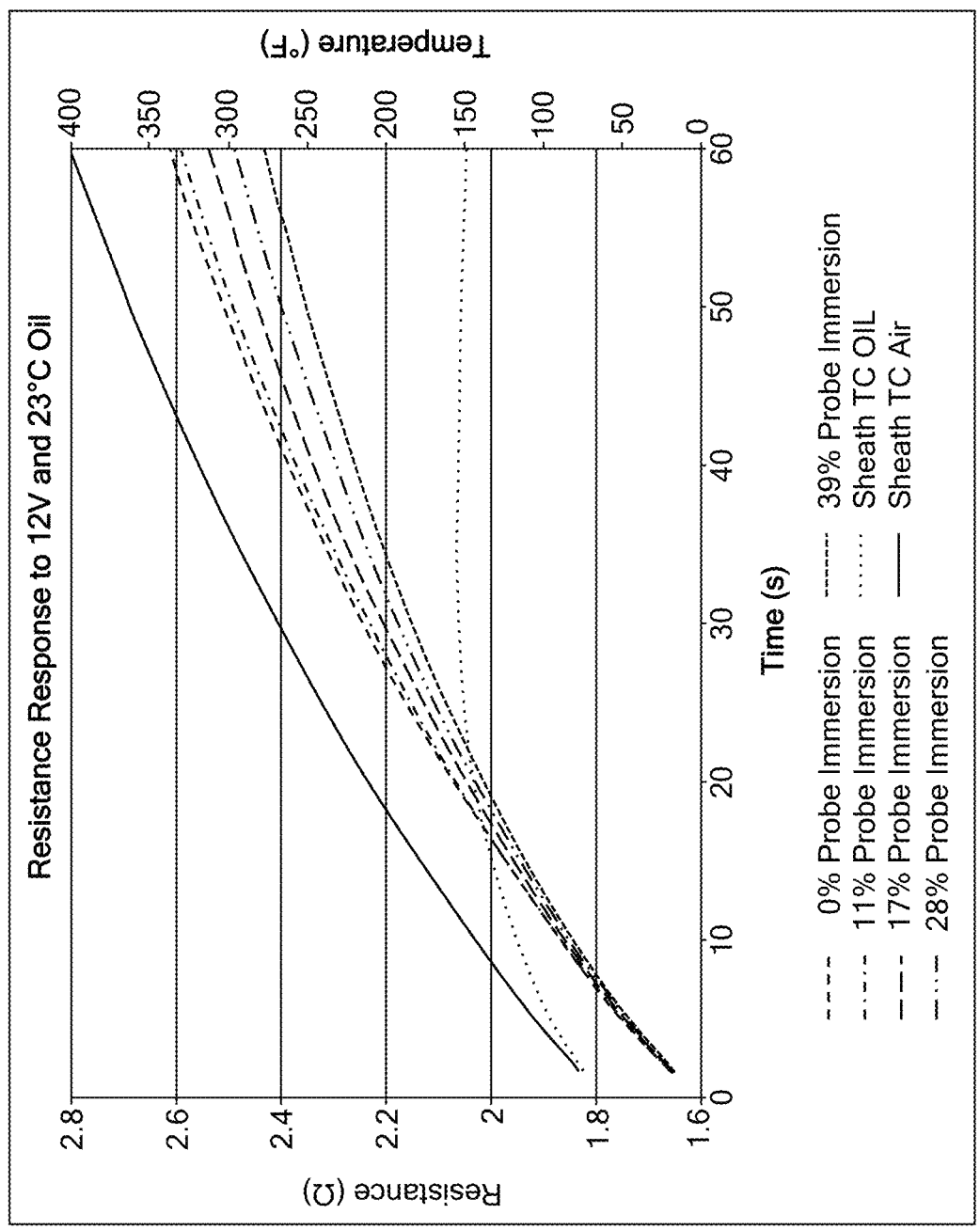
FIG. 3 is a graph that depicts an example of resistance response at different inputs.

The resistive heating element 124 is made of a material having a high temperature coefficient of resistance (TCR), such as nickel, and measures the average temperature along the length of the probe 102. The resistive heating element may be provided as a wire, foil, and/or thin film. The resistive heating element 124 is affected by both ambient and fluid temperatures simultaneously, and the thermocouples 120 and 122 are affected independently by ambient and fluid temperatures. Specifically, the resistive heating element 124 may be configured as "two-wire" heating elements such that it functions as a heater and as a temperature sensor. The resistive heating element 124 is connected to and is operable by the control system 102 by way of terminals $130_1$ and $130_2$ (collectively terminals 130). Such a two-wire capability is disclosed in, for example, U.S. Pat. No. 7,196,295, which is commonly assigned with the present application and incorporated herein by reference in its entirety. Generally, an electrical characteristic or response (e.g., voltage/current) is measured at terminals $130_1$ and $130_2$ and used to determine the resistance of the resistive heating element 124. The resistance is then used to determine fluid level. Specifically, the resistance of the resistive heating element 124 is a function of temperature and fluid level. For example, FIG. 2 illustrates an example correlation between the resistance detected by of a high TCR loop with the level of fluid (e.g., oil), and FIG. 3 illustrates an expected resistance response of an active level sensing provided by the control system. According to the graph of FIG. 3, resistance responses are a function of air and oil temperatures proportional to the length of sensing loop at each temperature.

In one form, the total resistance detected by the resistance element is further defined in equation 1 in which "$R_1$" represents resistance above the fluid (e.g., along $L_1$), "$R_2$" represents resistance about the surface of the fluid (e.g., along $L_2$), and "$R_3$" represents resistance below the fluid (e.g., along $L_3$). In one form, the fluid level (i.e., L2) may be determined using a predefined model that includes sensor material properties, sensor geometry, fluid properties, method of attachment and even vessel material properties/geometry. Each of the resistances $R_1$, $R_2$, and $R_3$ are defined in equations 2, 3, and 4, respectively. As described below, $R_{Total}$ is used by the control system 104.

$$R_{total}=R_1+R_2+R_3 \qquad \text{Equation 1}$$

$$R_1=f(T_{AMB},L_1) \qquad \text{Equation 2}$$

$$R_2=f(T_{AMB},T_{FL},L_2) \qquad \text{Equation 3}$$

$$R_3=f(T_{FL}+L_3) \qquad \text{Equation 4}$$

Figure 4:
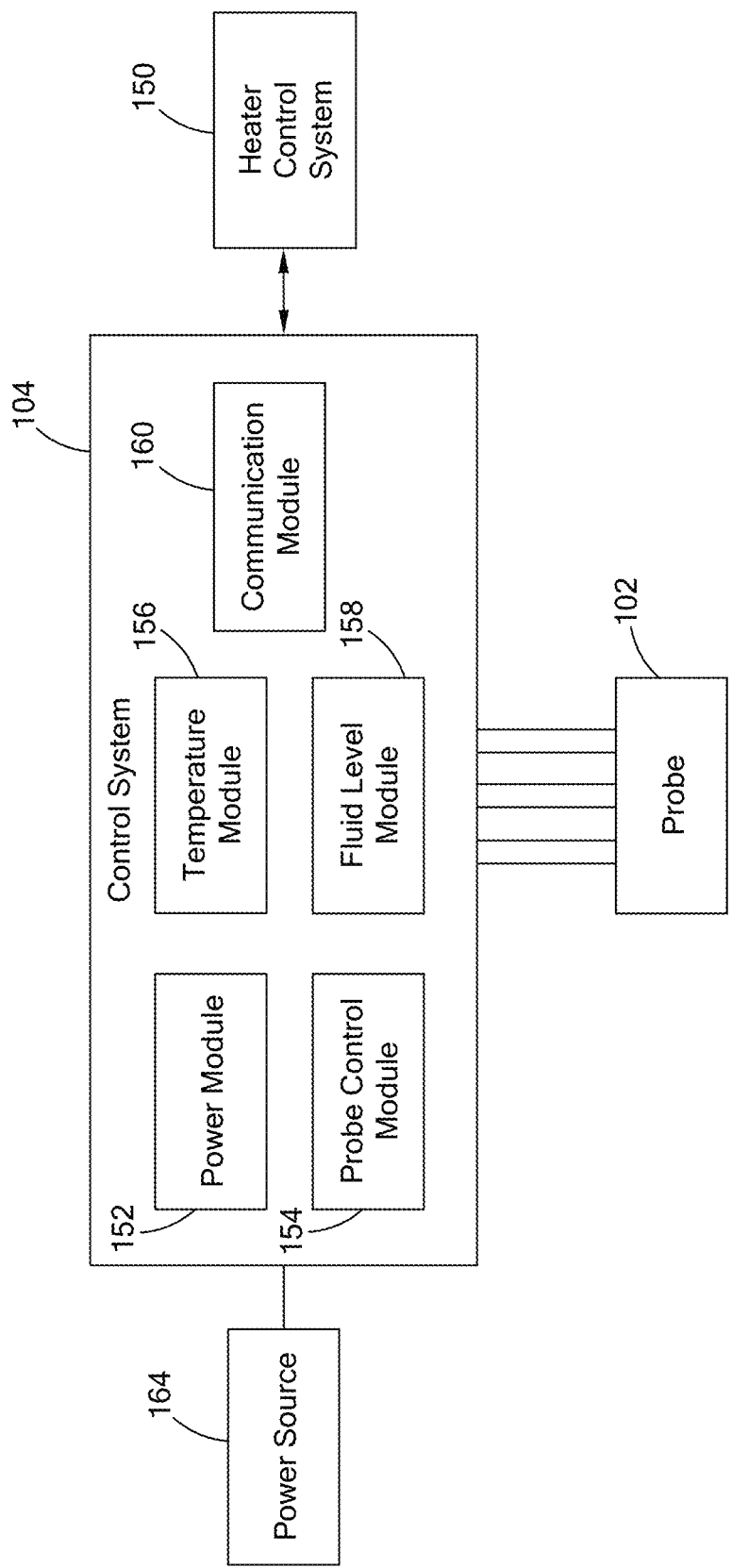
FIG. 4 is a block diagram of a control system of the fluid sensor system in accordance with the teachings of the present disclosure.

Referring to FIG. 4, the control system 104 is communicably coupled to a heater control system 150 that operates a heater heating the fluid of a heater system. The control system 104 transmits the measured performance characteristics to the heater control system 150, which controls the operations of the heater based on the characteristics. In one form, the control system 104 includes a power module 152, a probe control module 154, a temperature module 156, a fluid level module 158, and a communication module 160. In one form, the control system 104 includes a combination of electronics (e.g., microprocessor, memory, a communication interface, voltage-current converters, voltage-current measurement circuit, etc) and software programs/algorithms stored in memory and executable by the microprocessor to perform the operations described herein.

The power module 152 is configured to power the electronics within the control system 104 and to apply a designated power limit to the probe 102 based on a desired operation state of the probe 102. For example, the power module 152 may include a power regulator circuit (e.g., voltage dividers, voltage converters, etc) for adjusting the power from a power source 164 and applying the adjusted power to the probe 102.

The probe control module 154 is configured to select an operation state of the resistive heating element of the probe 102, and instructs the power module 152 to apply the designated power limit assigned for the selected state. More particularly, with the resistive heating element 124 provided as a two-wire control, the element 124 is operational as a heater or a sensor. To operate as a sensor, the power module 152 applies a small amount of power to the resistive heating element 124 (e.g., 0.1 mA current) to measure the resistance of the resistive heating element 124. To operate as a heater, the power module 152 is configured to apply a heat generating stimulus power to the resistive heating element 124 (e.g., 75 W, 100 W, and/or other suitable value based on the system characteristics). The heater state may be selected upon start-up of the heater system at which time the fluid temperature and the ambient temperature are substantially the same. Specifically, the fluid 106 has a different thermal diffusivity ($\alpha_1$) than air ($\alpha_2$, $\alpha_1 \neq \alpha_2$). Accordingly, when the fluid temperature and the ambient temperature are equal, the resistive heating element 124 is operated as a heater to generate the temperature differential along the length of the probe 102 in order to detect the presence of fluid. The heat generating stimulus power may be applied for a preset duration and/or until a temperature differential across partially immersed probe 102 is generated. Once the fluid is detected, it is safe for the heater of the heater system to begin heating the fluid. More particularly, starting the heater of the heater system without fluid or with low fluid could damage the heater. Once an appropriate temperature gradient is detected along the length of the probe, the probe control module 154 may then operate the resistive heating element 124 as a sensor.

Furthermore, the probe control module 154 may instruct the temperature module 156 and/or the fluid level module 158 to measure the electrical responses from the thermocouples 120 and 122, and the resistive heating element 124, as described further below. Specifically, with the resistive heating element 124 operating as a heater, the probe control module 154 may have the temperature module 156 monitor the electrical response from the thermocouples 120 and 122 to determine fluid and ambient temperatures. Alternatively, with the resistive heating element 124 operating as a sensor, the probe control module 154 may have the temperature module 156 and/or the fluid level module 158 monitor the electrical response from the thermocouples 120 and 122, and/or the resistive heating element 124. That is, in one form, the probe control module 154 may control the probe 102 to detect the electrical response of one or more of the thermocouples 120, thermocouple 122, and the resistive heating element 124. Accordingly, the probe 102 is operable as a heater only (no measurement of temperature), as a heater-sensor (heating by element 124 and temperature measurement by thermocouples 120 and 122), or a sensor only (no heating by the resistive heating element 124).

The temperature module 156 and the fluid level module 158 measure electrical responses from the thermocouples 120 and 122, and the resistive heating element 124, and are configured to determine the performance characteristics based on the electrical response and predetermined data. For example, one or more voltage-current measurement circuit measures the voltage/current at the terminals 126, 128, and 130. The temperature module 156 calculates the fluid temperature and the ambient temperature based on the voltage measured across terminals 126 and 128 respectively, and predetermined information that correlates the measure voltage to temperature. The fluid level module 158 measures the electrical response of the resistive heating element 124 at terminals 130 to determine the total resistance of the element 124. Using the resistance, the fluid temperature, the ambient temperature, and predetermined information (e.g., look-up tables and/or algorithms correlating temperature, resistance, and fluid level), the fluid level module 158 determines the fluid level.

The communication module 160 is configured to communicate with external devices, such as the heater control system 150 and/or a user interface (e.g., display, keyboard, mouse). In one form, the communication module 160 transmits the performance characteristics to the heater control system 150 to control the heating system. The communication module 160 may also output the performance characteristics to a display viewable by a user (not shown). In one form, the communication module 160 includes electronics for establishing wireless communication with the heater control system 150, such as a transceiver, or wired communication.

Figure 5:
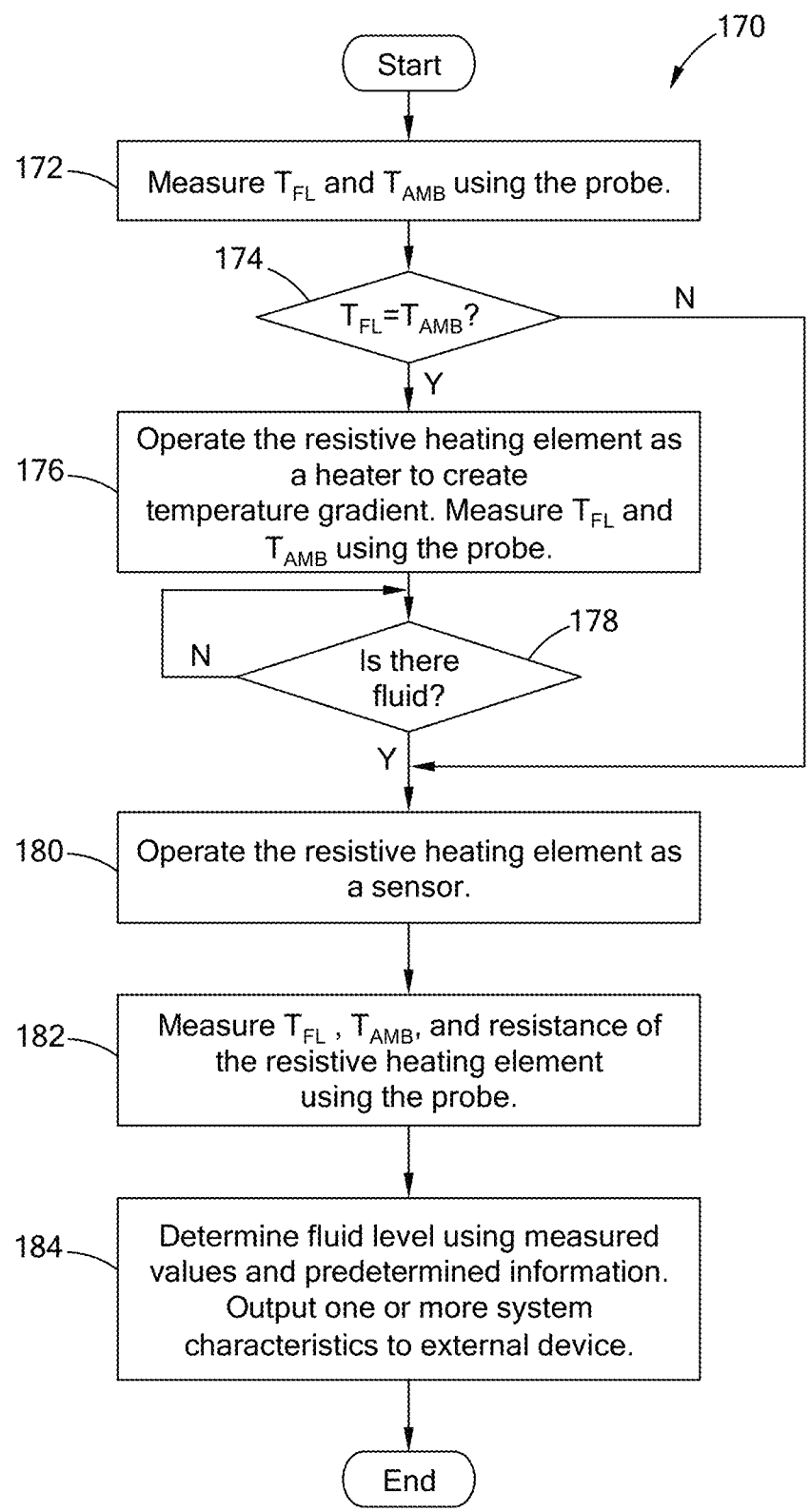
FIG. 5 is a flowchart of a fluid monitoring routine performed by the fluid sensor system in accordance with the teachings of the present disclosure.

Referring to FIG. 5, an example of a fluid monitoring routine 170 for measuring one or more performance characteristics using the fluid sensor system 100 of the present disclosure is provided. The routine 170 may be performed periodically or can be requested by an external device, such as the heater control system 150 or a user communicably coupled to the sensor system via, for example, a computing device.

At 172, the sensor system 100 measures the fluid temperature ($T_{FL}$) and the ambient temperature ($T_{AMB}$) using the fluid temperature sensor 120 and the ambient temperature sensor 122, and at 174, the sensor system 100 determines whether the fluid temperature is the same as the ambient temperature. That is, the sensor system 100 determines whether there is a temperature gradient present. If there is a difference, the sensor system 100 moves to 180. Otherwise, the sensor system 100 operates the resistive heating element 124 as a heater, at 176, and determines if fluid is present, at 178. More particularly, as a heater, the resistive heating element 124 generates a temperature differential along the length of the probe (i.e., areas of the probe immersed in fluid and extending in the ambient atmosphere), which is verified by the sensor system 100 when it measures the fluid temperature and the ambient temperature, at 176.

After fluid has been detected, the sensor system 100, at 180, operates the resistive heating element 124 as a sensor, and then measures the fluid temperature, the ambient temperature, and the resistance of the resistive heating element, as described above, at 182. Using the measured values and predetermined information, the sensor system 100, at 184, determines the fluid level and outputs the performance characteristics (e.g., fluid level, fluid temperature, and/or ambient temperature) to the external device.

The sensor system 100 can be configured in other suitable ways while remaining within the scope of the present disclosure, and is not limited to the process of FIG. 4. For example, after determining that fluid is present, the system 100 may notify the heater control system 150 that the fluid is present and to heat the fluid. In yet another variation, with the presence of the temperature gradient, the sensor system 100 may continuously monitor the fluid level by applying a low stimulus power (e.g., current 0.1 mA) to the resistive heating element. In yet another example, the sensor system 100 may continue to operate the resistive heating element 124 as a heater or shut-off power to the element 124 after detecting fluid.

Figures 6A, 6B:
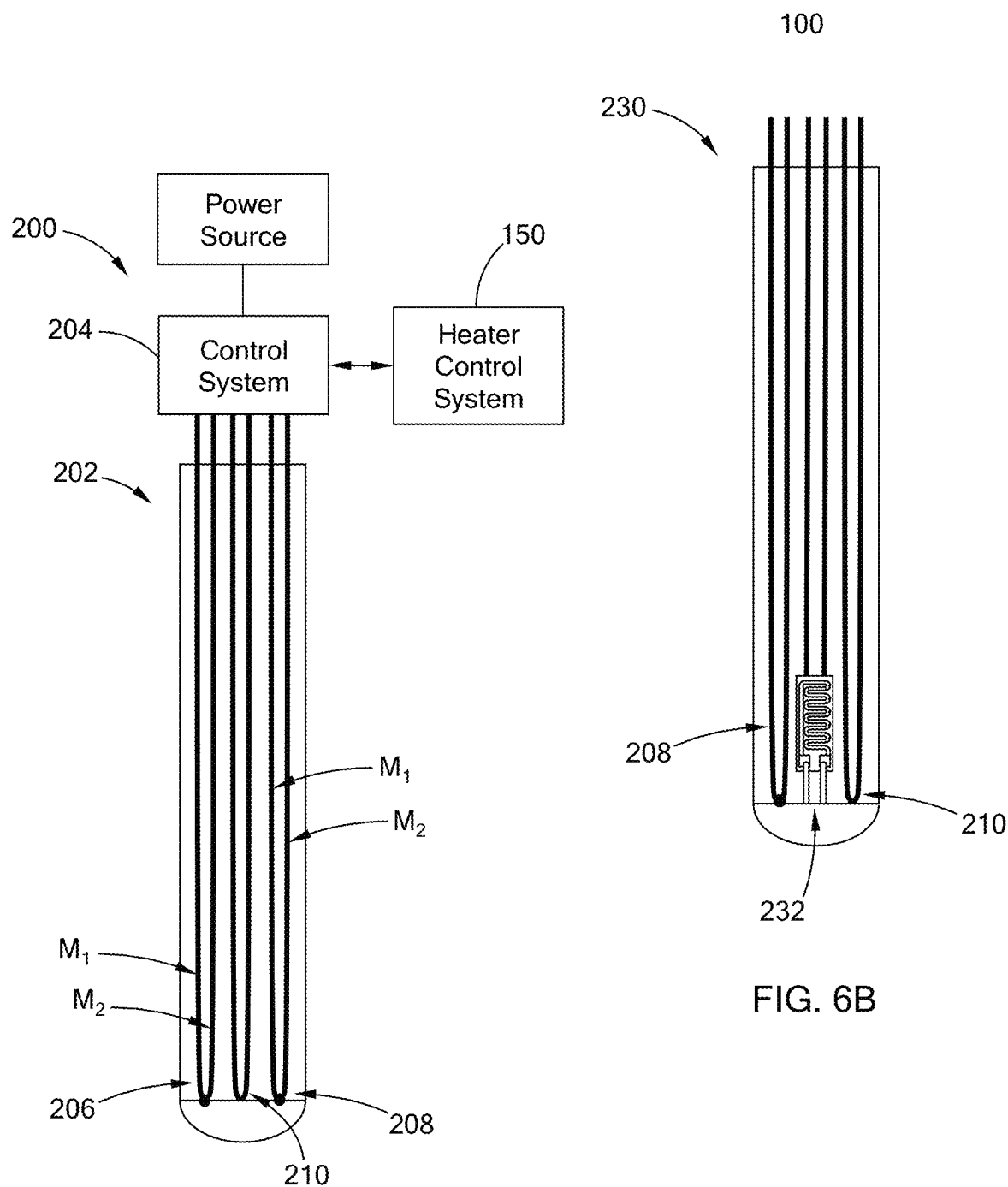

The fluid sensor system can be configured in other suitable ways for measuring the one or more performance characteristics. For example, FIGS. 6A, 6B, 6C, and 6D illustrate different types of probes for measuring one or more performance characteristics. FIG. 6A illustrates a fluid sensor system 200 having a probe 202 and a control system 204. The probe 202 includes a fluid temperature sensor 206, a limit sensor 208 for measuring a high (maximum) limit, such as maximum temperature at a specific location, and a resistive heating element 210. In one form, the fluid temperature sensor 206 is a thermocouple that is configured and operates in a similar manner as the fluid thermocouple 120 to measure the fluid temperature. The resistive heating element 210 is configured and operates in a similar manner as the resistive heating element 124. In lieu of the ambient thermocouple 122, the probe 202 includes the limit sensor 208, which is provided as a thermocouple made of two different materials having different Seebeck coefficients (e.g., $M_1$ and $M_2$).

The control system 204 is electrically coupled to the fluid temperature sensor 206, the limit sensor 208, and the resistive heating element 210. The control system 204 is configured in a similar manner as the control system 104 to operate the probe 202, and measure the fluid temperature and fluid level. More particularly, in one form, the control system 204 obtains the ambient temperature from for example, a cold junction compensation (CJC) provided within the control system, or a temperature sensor (not shown) provided in the heater control system 150. With the ambient temperature, the control system 204 operates the probe 202 to measure the fluid temperature and/or fluid level.

Furthermore, the control system 204 is also configured to determine whether the fluid temperature is outside a preset threshold based on the output of the limit sensor 208, and is configured to perform a protective action based on the high fluid temperature. For example, with the limit sensor 208 as a thermocouple, the temperature module of the control system 204 is configured to measure the voltage change across the terminals connected to the limit sensor 208 and determine the temperature at the junction of the limit sensor 208 (i.e., diagnostic temperature) based on predetermined data. The control system 204 may include a diagnostic module (not shown) that compares the diagnostic temperature to a preset temperature limit. If the diagnostic temperature is above the temperature limit, the diagnostic module performs the protective action, which may include notifying the heater control system 150 via the communication module 160 of the high fluid temperature and recommending shutting-off power to the heating element. The protective action may also be operating a power switch (e.g. a relay) connected between a power source and the heater of the heater system (not shown) to shut-off power to the heater. Other suitable protective action, such as notification to an operator, may also be implemented while remaining within the scope of the present disclosure.

The fluid temperature sensor of the probe 102, 202 may be other suitable sensors, and should not be limited to a thermocouple. For example, FIG. 6B illustrates a probe 230, which has the limit sensor 208 and the resistive heating element 210. In lieu of the thermocouple, the probe 230 includes a resistance temperature detector (RTD) 232, as the fluid temperature sensor. With the RTD 232, the temperature module of the control system 204 is configured to determine the fluid temperature based on a resistance feedback detected by the RTD 232, and predetermined information that correlates the resistance feedback with temperature.

With probe 202 or probe 230, the fluid sensor system is configured to measure multiple performance characteristics, such as fluid temperature, fluid level, and/or diagnostic temperature with one sensor device. Thus, reducing the complexity of the number of sensors providing information to the heater control system.

Figure 6C:
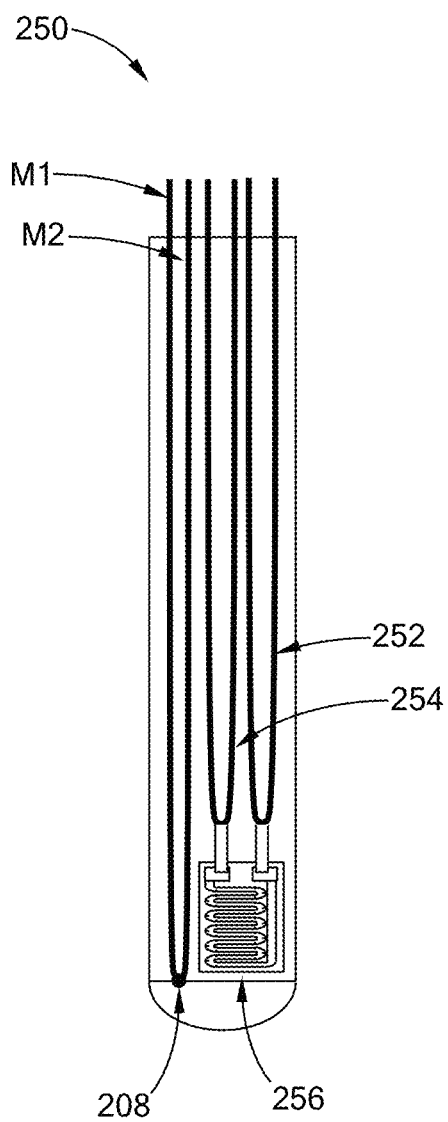
Figure 6D:
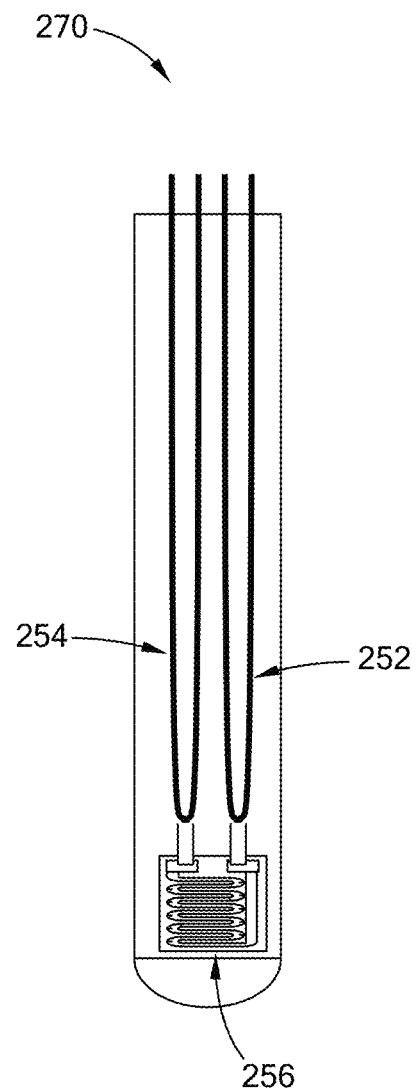
Figure 7A:
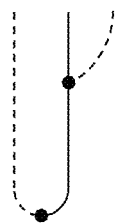
Figure 7B:
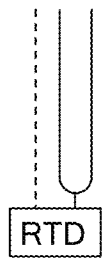
Figure 7C:
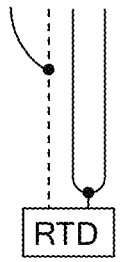
Figure 7D:
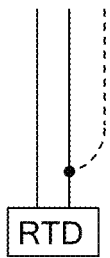
Figure 7E:
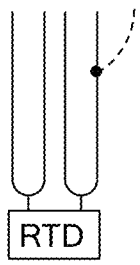
Figure 7F:
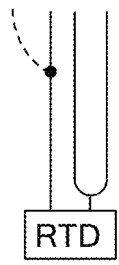
Figure 7G:
Figure 7H:
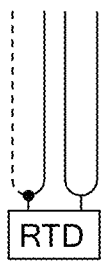
Figure 7I:
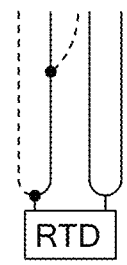
Figure 7J:
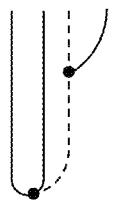

In yet another variation, FIG. 6C illustrates a probe 250 that has the limit sensor 208, and a four-wire RTD in which one loop 252 is made of a high TCR material to form the resistive heating element and a second loop 254 is made of the same material. Loop 208 forms a fluid temperature sensor. The high TCR loop can be Balco, nickel, copper, molybdenum etc. Loops 252 and 254 are coupled to an RTD 256 for providing a more accurate resistance measurement used for determining fluid level and fluid temperature. Both loops 252 and 254 are used simultaneously to detect fluid temperature through the RTD. The control system is configured to quickly switch between detecting the fluid temperature through the RTD and the fluid presence or level by measuring the loop resistance of 252, 254, or both. One or both high TCR loops could be used as a heater or a sensor or as a heater and sensor simultaneously. In another variation shown in FIG. 6D, a probe 270 does not include the limit sensor, but has the four-wire RTD similar to FIG. 6C.

FIGS. 7A to 7J illustrate other wire configurations that can be used in the probe to form one or more of the fluid temperature sensor, the resistive heating element, and the ambient temperature sensor. In FIGS. 7A to 7J, the dashed line represents a first material (e.g., CHROMEL), the solid represents a high TCR material (e.g., Nickel), and a node illustrates a thermocouple junction.

In one form, the present disclosure is directed toward a fluid sensor system that includes a probe and a control system. A portion of the probe is immersed in a fluid that is being heated by a heating system. The probe includes a resistive heating element that is used to determine a fluid level and for creating a thermal gradient between the fluid and the air.

As described herein, the probe of the fluid sensor system can be configured in various suitable ways to measure at least the fluid temperature, the fluid level, and provide a heating feature in the event the fluid temperature is the same as the air temperature. For example, the probe can be a 4-wire mineral insulated RTD with nickel leads to measure fluid temperature and level with standard thermocouple integrated to measure ambient. In such configuration, the RTD has a higher accuracy than a thermocouple for fluid temperature measurement. Alternatively, the probe can include a mineral insulated nickel-CHROMEL thermocouple, where ambient is assumed to be the cold junction compensation (CJC) in the control system, the Seebeck effect provides the temperature of the fluid, and the high TCR of the nickel provides fluid level sensing. In this form, the number of wires provided within the probe is reduced.

Based on the foregoing, the fluid sensor system of the present disclosure includes a probe of finite length that includes at least one resistive heating element (e.g, a resistance circuit, such as resistance wire, foil, film) with a high thermal coefficient of resistance, and at least one temperature sensor for determining the temperature of the fluid, such as a RTD or thermocouple. The probe may also include a second temperature sensor for measuring ambient temperature above the fluid, such as a RTD or thermocouple.

As described herein, the probe can be configured in various suitable ways to include at least the resistive heating element and the fluid temperature sensor. For example: at least one wire is utilized for both RTD and Seebeck effect temperature determination; at least one wire is utilized for both the purpose of fluid temperature and fluid level detection (resistive element); at least one wire is utilized for detecting both fluid and ambient temperatures; at least one wire is utilized for both detecting ambient temperature and fluid level detection; the leads from a 4-wire RTD are used in measuring fluid level.

The fluid sensor system further includes a control system that is configured to regulate power to provide a predetermined amount of power, such as a stimulus current applied to heat the resistive element, a low non-heating monitoring current applied to the resistive element, and/or a low monitor current applied to a RTD if included for fluid temperature measurement.

The control system is configured to measure an electrical response such as a voltage across the resistive element, voltage from the thermocouple, and/or voltage across a RTD. The control system is further configured to operate the resistive element of the probe as: (1) a heater by applying a heat generating stimulus current to the resistive heating element to generate a temperature differential across a partially immersed probe, or (2) a sensor by applying a monitoring current (i.e., a stimulus current) to the resistive heating element if there is already a thermal differential between the fluid and ambient. The stimulus current is applied to the resistive element to sense the presence of fluid, and the response of the resistive element when the monitoring current is applied in combination with the fluid temperature is used to determine the level of the fluid.

The control system may be configured to perform additional operations while remaining within the scope of the present disclosure. For example, the control system may store the performance characteristics measured as a fluid history, which may be used to form an operation model of the probe or the heater system.

In another form, the present disclosure is directed toward an integrated heater-sensor for generating heat and for measuring one or more performance characteristics of the heater system. Accordingly, in one form, the integrated heater-sensor includes at least one resistive heating element for generating heat and a temperature sensor for measuring temperature at a designated location. For explanation purposes, the heater system having integrated heater-sensor is described as a liquid heater system for heating liquid, such as oil, and the integrated heater-sensor is operable to measure at least one of fluid level, fluid temperature, as the performance characteristics. However, the integrated heater-sensor of the present disclosure may be used for other applications (e.g., exhaust systems, flexible pipe heaters, etc) and should not be limited to liquid heater systems. In addition, as described further below, the integrated heater-sensor may also be used to determine preventative maintenance scheduling, or, more generally, various servicing parameters for a system based on the system characteristics and predetermined limits/algorithms etc.

Referring to FIG. 8, a heater system 300 includes an integrated heater-sensor device 302 (i.e., an integrated heater device 302) operable as a heater, a sensor, or a combination thereof, and a heater control system 304 that is configured to operate the integrated heater device 302 based on data from the idevice 302 and predetermined information including, but not limited to algorithms, system models, predetermined set-points, look-up tables, etc. The heater system 300 is operable to heat a liquid 306, such as oil, provided in a container 308. More particularly, the heater control system 302 regulates power from a power source 310 to apply a desired electric power to the heater device 302. The amount of power applied to the heater device 302 is determined based on one or more performance characteristics measured by the heater device 302.

Here, the heater device 302 includes at least one multiportion resistive element defined by at least two different materials having varying TCR. More particularly, in one form, referring to FIG. 9, the heater device 302 is configured to include a multiportion resistive element 320 embedded within a sheath 321. The multiportion resistive element 320 includes a first portion generally identified with reference number 322, and a second portion 324 generally identified by reference number 324. In one form, the first portion 322 is coupled to a first power pin 326, and the second portion 322 is coupled to the first portion 322 and extends along the sheath 321.

The first portion 322 is defined by a first conductive material (e.g., nickel) and the second portion 324 is defined by a second conductive material (e.g., nichrome) having a lower temperature coefficient of resistance (TCR) than the first conductive material. More particularly, both the first and second conductive materials generate heat, but the first conductive material, with its high TCR, exhibits varying resistance due to temperature, and thus, is further utilized as a sensor, as described further herein. While specific examples are provided for the first and second conductive material, other suitable materials may be used while remaining within the scope of the present disclosure.

In one form, the first portion 322 is configured to extend along a designated area that undergoes a temperature differential. For example, in FIG. 9, the portion 322 extends between a liquid level range ($L_R$) that is defined by a maximum and minimum liquid levels ($L_{Max}$ and $L_{Min}$) with the actual liquid level provided between. Accordingly, the first portion 322 is operable to not only heat the liquid 302, but to detect the presence of fluid in similar manner as the probe above, and measure the liquid level, as described below.

In one form, the second portion 324 is configured to be fully submerged in the liquid 306 when the heater device 302 is disposed in the container 308. Like the first portion 322, the second portion 324 is operable to heat the liquid, but does not undergo a change in resistance. Accordingly, the resistance of the heat portion 324 stays substantially constant, even during a cold start. In the following, the first portion and the second portion may be referred to as a level sensor portion 322 and a heating portion 324, respectively.

By having the multiportion resistive element, the heater device 302 may exhibit the following properties: (1) an increase in the strength of a signal that measures the ratio of resistance change for a high vs a low oil level if a section of the multiportion resistive element is made of a high TCR material as compared to a construction where the entire element is of a high TCR material; (2) the signal associated with changes in fluid level can be disambiguated from resistance changes due to variation in liquid temperature when a small section of the high TCR material is used vs the entire coil being made of such a material; and (3) the resistance of an all high TCR coil may be low at room temperature (e.g. when the heater device 302 is first started after an idle period), which can cause a high electric current when the design voltage is applied and until the resistive element warms to near operating temperature. This high current can overload the power supply circuits.

In one form, the multiportion resistive element 320 of the heater device 302 includes a fluid temperature sensor and/or an ambient temperature sensor. More particularly, the multiportion resistive element 320 includes a third portion that is generally identified by reference number 328, and is defined by a conductive material that has a high TCR. For example, the third portion 328 may be made of the same material as the level sensor portion 322. The third portion 328 is configured to be fully submerged in the liquid 306 to measure the fluid temperature when the element 320 is operated as a sensor. The fluid temperature is determined based on the change in resistance of the third portion 328, and since most of the multiportion resistive element 320 is formed of the low TCR material, the amount of error or ambiguity associated with the temperature distribution along the entire length of the multiportion resistive element 320 is negligible or at least significantly reduced. In the following, the third portion 328 may be referred to as a fluid temperature sensor portion 328.

In one form, the multiportion resistive element 320 is coupled to a thermocouple junction 330 positioned above the maximum liquid level to measure an ambient temperature. For example, the junction 330 is defined by a first pin 332 and a second pin 334 that is made of a material having a different Seebeck coefficient than that of the first pin 332. Here, the second pin 334 also operates as the other power pin which couples to the heater control system 304. In one form, the first pin 332 is made of a material having similar or the same Seebeck coefficient as the low TCR material of the heating portion 324.

The junction 330, as a thermocouple, generates electrical response (e.g., mV signal) that is a function of temperature, and the heater control system 304 determines the temperature based on predetermined data such as a system model, predetermined functional relationship, and/or look-up table that correlates the electrical response with temperature. Such thermocouple (TC) power pin is disclosed in U.S. Ser. No. 14/725,537, filed May 29, 2015 and titled "RESISTIVE HEATER WITH TEMPERATURE SENSING POWER PINS," which is commonly owned with the present application and the contents of which are incorporated herein by reference. The temperature at the junction 330 is a function of fluid temperature, fluid level, and heater power, in addition to ambient temperature. The values other than ambient temperature can be determined as described herein.

Based on the foregoing, the heater device 302 is provided as having the multiportion resistive element 320 with a level sensor portion 322, a fluid temperature sensor portion 328, and the heating portion 324, and is connected to a thermocouple junction 330 for measuring ambient temperature. The heater device 302 may be configured in other suitable ways while remaining within the scope of the present disclosure. For example, referring to FIG. 10, in one form, in addition to the multiportion resistive element 320, a heater device 302B includes at least one uniform resistive element 340 that extends parallel with the multiportion resistive element 320 and is made of a low TCR material for generating heating. To clarify, both resistive elements 320 and the 340 are resistive heating elements that generate heat. However, unlike the multiportion resistive element 320, the uniform resistive element 340 is made of one material that has a low TCR material, and is only operable as a heater; whereas the multiportion resistive element 320 is formed of multiple materials of different TCR to operate as a heater or a sensor. The uniform resistive element 340 is connected to the heater control system 304 via power pins 342 and 344, and thus, while it extends in parallel with the multiportion resistive element 320, it is a separate electric circuit than that of the multiportion resistive element 320. The resistive heating elements can be formed via wires, foil, thin-film process, or other suitable process.

The sensor portions provided along the multiportion resistive element 320 may be distributed among multiple multiportion resistive elements. For example, FIG. 11, illustrates a heater device 302C that includes a first multiportion resistive element 350 having the level sensor portion 320, and a second multiportion resistive element 352 having the fluid temperature sensor portion 328. While not illustrated, the heater 320C may also include one or more uniform resistive elements. In another variation, the integrated heater-sensor of the present disclosure may not include all the sensor portions described herein. For example, the heater device 302C of FIG. 11 may only include the multiportion resistive element 350, and not 352.

Other suitable configuration of the integrated heater may also be used while remaining within the scope of the present disclosure. For example, in one form, the thermocouple junction may be disposed at a power pin of the uniform resistive element instead of the multiportion resistive element. In another example, in lieu of the thermocouple junction, a multiportion resistive element may include a portion made of the first conductive material (i.e., material having a high TCR) that is positioned above the maximum fluid level to measure the temperature of the ambient air and form an ambient sensor portion. In one form, the resistance of the first conduction material is selected to be low enough to avoid overheating that section of the heater under maximum duty cycle, maximum locally generated power due to the current resulting from heater operation, and maximum ambient temperature conditions.

Based on the configuration of the heater device 302, the heater control system 304 is configured to operate the heater device 302 as, for example, a heater, a heater-sensor, or a sensor. Referring to FIG. 12, in one form, the heater control system 304 includes a heater control module 380, a performance characteristics module 382, and a power module 384. The heater control module 380 is configured to control the operation of the heater device 302 (e.g., as a heater, a sensor, a heater-sensor, or off-state). For example, if the heater device 302 includes at least one multiportion resistive element 320, and at least one uniform resistive element or at least two multiportion resistive elements 320, then the heater device 302 is operable as a heater, a heater-sensor, and a sensor. Alternatively, if the heater device 302 includes one multiportion resistive element, the heater device 302 is operable as a heater or a sensor.

As a heater, the heater control module 380 has a first power level (e.g., 75 Watt, 100+ Watts, or other suitable power based on the system characteristic) applied to the multiportion resistive element 320 and/or the uniform resistive element. As a sensor, the heater control module 380 operates the heater device to detect electrical characteristics of at least one of the multiportion resistive element 320 by having a small amount of power (i.e., a stimulus power) applied to the multiportion resistive element 320 (e.g., 0.1 mA current). In one form, as a sensor, the heater control module 302 applies the stimulus power to at least one of the multiportion resistive elements and does not apply power to the uniform resistive element(s) and/or other multiportion resistive element(s). As a heater-sensor, the heater control module 380 is configured to apply the low stimulus power to at least one of the multiportion resistive elements and a first power level to the uniform restive element(s) and/or other multiportion resistive element(s).

In one form, the heater control module 380 may switch between the various operations states (e.g., heater, sensor, heater-sensor, off-state) based on predetermined cycling program (e.g., operate as sensor/heater-sensor ever 5-mins and then as a heater). Other suitable control schemes may be used to have the heater control module 380 switch between the different states.

Similar to the power module 152 of the sensor system, the power module 152 is configured to power the electronics within the heater control system 304 and to apply a designated power limit to the heater device 302 based on the selected operation determined by the heater control module 380 heater device 302. For example, the power module 152 may include a power regulator circuit (e.g., voltage dividers, voltage converters, etc) for adjusting the power from a power source 164 and applying the adjusted power to the probe 102. heater device 302

Using the electrical response of the heater, the performance characteristics module 382 calculates one or more performance characteristics of the heater device 302, and provides the calculated values to the heater control module 380 for controlling the heater device 302. For example, the fluid level is a function of the magnitude of changes in resistance and the time rate of change of resistance with a known or predetermined power level. Accordingly, the performance characteristics module 382 determines the fluid level using a system model, a functional relationship (e.g., predetermined algorithms), or a look-up table that maps the fluid level to changes in resistance based on the resistance change and time rate of change values. The electrical response is a function of the physical characteristics as defined by the system (geometry, materials, etc).

The heater control system 304 may be configured to perform other operations while remaining within the scope of the present disclosure. For example, in one form, the heater control system 304 may communicate with external devices, such as a computing device, a display, keyboard, buttons, touchscreen, etc, for receiving data from a user and/or for displaying information regarding the heater system. For example, the heater control system 304 may receive temperature set point, commands for controlling the operation state of the heater, and/or other information via the external device. In return, the heater control system may display, for example, a graphical user interface that shows selectable commands, current operation state of the heater, current fluid temperature, fluid level, quality, and/or other suitable information.

In one form, the integrated heater having sensing capabilities can be implemented as part of a virtual sensing system to determine parameters of the heating system without the use of additional sensor. For example, a virtual sensing system having the integrated heater-sensor of the present disclosure may be used to determine parameters such as (1) fluid reservoir temperature, (2) fluid reservoir level, and (3) fluid reservoir quality with at least one heater to maintain the temperature, level, and quality of fluid in the system. One such virtual sensing system is described in is provided in co-pending application, U.S. Ser. No. 15/447, 942, filed Mar. 2, 2017 and titled "VIRTUAL SENSING SYSTEM" which is commonly owned with the present application and the contents of which are incorporated herein by reference in its entirety. This application describes a virtual sensing system for a heating system provided in an exhaust system. Generally, a control system is configured to calculate one or more values for the heating system based on a set of known variables and predefined algorithms. Using the calculated values and physical characteristics of the heating system, the control system controls the heater. Such a control system may be implemented for a fluid heating system in which a liquid, such as oil is being heated.

For example, for the heating system of the present disclosure, a virtual sensing system can be used to determine the fluid temperature, fluid level and/or fluid quality if at least two of the three other parameters are known. For example: the fluid reservoir temperature may be determined if fluid reservoir level and quality are known; the fluid reservoir level may be determined if fluid reservoir temperature and quality are known; and the fluid quality may be determined if fluid reservoir temperature and level are known.

In implementing the virtual sensing system, in one form, the heater control system of the present disclosure is configured to receive at least one input from among: fluid level, fluid quality, parameters derived from physical characteristics of the heating system, and combinations thereof. The at least one input further includes at least one of power input and system input to the heater of the heater system. Physical characteristics may include, by way of example, resistance wire diameter, MgO (insulation) thickness, sheath thickness, conductivity, specific heat and density of the materials of construction, heat transfer coefficient, and emissivity of the heater and fluid conduit, among other geometrical and application related information.

In one form, with the heater having a sheath, the control system is configured to determine a sheath temperature ($T_s$) of the heater based on parameters derived from physical characteristics of the heating system. Alternatively, the heater can be a layered heater having a heater surface temperature, and the heater control system is configured to determine the heater surface temperature ($T_s$) by, for example, the following equation in which:

$$c_s \cdot m_s \cdot \frac{dT_s}{dt} = \left( \frac{T_1 - T_s}{\frac{D_1}{k_1 \cdot A_1} + \frac{D_s}{k_s \cdot A_s}} \right) - \left( \frac{T_s - T_v}{\frac{D_s}{k_s \cdot A_s} + \frac{1}{h_{c_1} \cdot A_{v_1}}} \right)$$

$c_s$ is a specific heat of heater sheath material
$m_s$ is a mass of sheath material
$T_s$ is a temperature of sheath material
$T_v$ is a temperature of fluid (oil vat)
$T_1$ is a temperature of MgO insulation material
$D_1$ is a thickness of MgO insulation material
$D_S$ is a thickness of sheath material
$k_1$ is a thermal resistivity of MgO material
$A_1$ is a cross sectional area of MgO material
$k_S$ is a thermal resistivity of sheath material
$A_s$ is a cross sectional area of sheath
$h_{C1}$ is a coefficient of convection of sheath
$A_{V1}$ is a ross sectional area of the fluid (oil vat) exposed to sheath The heater control system may also be configured to calculate the fluid temperature ($T_v$) from physical characteristics of the heating system, and may be determined by, for example, the following equation:

$$c_v \cdot m_v \cdot \frac{dT_v}{dt} = \left( \frac{T_s - T_v}{\frac{D_s}{k_s \cdot A_s} + \frac{1}{h_{c_1} \cdot A_{v_1}}} \right) - \left( \frac{T_v - T_{amb}}{\frac{1}{h_{c_2} \cdot A_{v_2}} + \frac{1}{h_{c_3} \cdot A_{v_3}} + \frac{1}{h_{env} \cdot A_{env}}} \right)$$

$c_v$ is a specific heat of fluid reservoir
$m_v$ is a mass of fluid reservoir
$T_s$ is a temperature of sheath material
$T_v$ is a temperature of fluid (oil vat)
$T_{ab}$ is a temperature ambient environment
$D_S$ is a thickness of sheath material
$k_1$ is a thermal resistivity of MgO material
$A_1$ is a cross sectional area of MgO material
$k_S$ is a thermal resistivity of sheath material
$A_s$ is a cross sectional area of sheath
$h_{C1}$ is a coefficient of convection of sheath
$A_{V1}$ is a cross sectional area of the fluid (oil vat) exposed to sheath
$h_{env}$ is a coefficient of convection of the fluid reservoir to environment
$A_{env}$ is a cross sectional area of the fluid reservoir exposed to environment Accordingly, parameters derived from physical characteristics of the heating system can determine at least one of sheath temperature ($T_s$) and temperature of the fluid ($T_v$). The fluid temperature ($T_v$) may be obtained from the integrated heater of the present disclosure, and/or the fluid sensor system of the present disclosure, as described herein. With the virtual sensing system, the heater control system of the present disclosure is operable to predict temperatures associated with the heater and temperatures associated with the fluid without specific sensors. It should be noted that other equations may be used as part of the virtual sensing system and should not be limited to the equations provided.

The heater control system may determine the heater sheath temperature based on at least one of heater geometry, input power, high TCR element resistance, thermocouple power pins with system properties, oil temperature, and system-model. Alternatively, the TCR along with a power map may be used to calculate sheath temperature. These methods provide benefits such as heating liquids faster in transient without scorching, enhanced safety, increasing accuracy of temperature sensing than if sensor is attached, increasing life of liquid, and reducing over-heating the liquid, among others.

In one form of the present disclosure, the heater control system is configured to perform a self-calibration for calibrating the heating system. The self-calibration includes measuring fluid temperature after cool down to obtain a steady state at room temperature using, for example, at least one of a cold junction compensation sensor for a TC power pin system, a small surface mount RTD, or thermistor on the printed circuit board (PCB). After measuring the steady state room temperature, the control system applies an accurately measured pulse of power to the heater. The measured pulse of power should be short enough such that the temperature response is independent of the fluid quantity in fluid reservoir. Next, comparing a time-temperature response observed to a predefined time-temperature response measured when the fluid heating system was formed, such as during a factory calibration or during installation of the fluid heating system. By comparing the time-temperature responses, a second calibration point, such as for example at a peak temperature or after a predetermined time period and at an elevated temperature (in addition to the room temperature point), is obtained. In one form, the resistance slope response may also be used in place of or in addition to the second calibration point.

For the self-calibration process, in lieu of waiting for steady state at room temperature, a rate of change of a temperature signal from the heater (i.e. rate of change of resistance or mVoltage) is measured, and a system model is used to extrapolate what the signal will settle to be at steady state. The rate of change is then calibrated to a room temperature measurement at, for example, the PCB.

In another form, the self-calibration includes waiting until the reservoir is empty, heating a wire above curie point, and measuring resistance at point of maximum TCR slope (derivative of TCR curve). In one example, if nickel is used as the high TCR material, the point of maximum TCR slope is 358.2° C. The calibration further includes using resistance from power burst for potential second calibration point.

In another self-calibration, a calibration point is provided as the local maximum for a nickel-chromium resistance (e.g., 550° C. for nichrome 80) for a calibration point. The calibration includes waiting until reservoir is empty to heat wire to 550° C., for example, after filtering or cleaning. Next, stimulating a heater with high current such that the wire reaches 550° C. and a sheath remains cooler. The sheath should be lower than the flash point of the liquid to inhibit high stress on the wire and increase the heater life.

Separate liquid temperature sensors may also be used for the self-calibration. Specifically, the calibration includes waiting for heater temperature to reach equilibrium temperature with the liquid, using a separate liquid temperature sensor to calibrate at several temperatures, and using a priori information to extrapolate above liquid temperatures for high limit.

Other features/steps may be used for self-calibration while remaining within the scope of the present disclosure. For example, the following may be used for self-calibration: Nickel-Iron alloys with uniquely adjustable properties, such as an inflection or peak slope; and power vs resistance response history inputs, such as start up or during controlled cooling; predetermined and predictable drift characteristic of at least one heater circuit can be used to eliminate the need for field calibration. Self-calibration adjustment may occur periodically over the life of the heating system.

In one form, the control system may also be configured to include a system model for preventing physical damage or other unforeseen influences on the heater system. For example, the system model is configured to predict time rate of change in temperature associated with various operating conditions or for test energy pulses (e.g., the heater is cooled a few degrees below the target set point before a measured pulse of energy is applied and the response is observed). Resistance or mV changes that are out of the expected range may imply that there is an issue, and an alarm or error code could be generated or used in some other way to precipitate a decision about whether to allow continued operation.

With regard to the self-calibration and virtual sensing feature, the fluid temperature can be matched to the CJC by using a system model, which may be an exponential decay equation with parameters that would be determined from the change in cooling rate over time and that would be used to extrapolate the eventual steady state temperature. If the room temperature is not constant, a more complicated model may be needed. For example, the CJC or a small, inexpensive, PCB mounted sensor can be used to measure room temperature, and the system model may then determine the temperature difference between the fluid and the room based on cooling rate, thus providing a temperature for calibrating the fluid or heater temperature sensing feature.

The fluid sensor system and the heater system with integrated heater-sensor of the present disclosure may reduce the number of independent sensors used for a heater system. The virtual sensing feature described herein may be implemented as part of the heater system that has the fluid sensor system and/or a heater system with the integrated heater-sensor.

It should be noted that the disclosure is not limited to the embodiment described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. A fluid sensor system for a heating system, the sensor system comprising:
a probe having a finite length a portion of which is immersed in a fluid, the probe comprising a resistive heating element and a fluid temperature sensor for measuring one or more performance characteristics, wherein the fluid temperature sensor is configured to measure a fluid temperature, and the resistive heating element is operable as a heater to create a temperature differential along the length of the probe to detect the fluid, and wherein the resistive heating element is operable to measure a fluid level; and a control system configured to operate the probe and determine the one or more performance characteristics of the heating system based on at least one of an electrical response of the resistive heating element operating as the sensor and an electrical response of the fluid temperature sensor, wherein the control system is configured to:

apply a first power amount to the resistive heating element to generate the temperature differential when the fluid temperature is substantially the same as an ambient temperature; and apply a second power amount less than the first power amount to measure resistance of the resistive heating element when the fluid temperature is different from the ambient temperature.

2. The fluid sensor system of claim 1 wherein the one or more performance characteristics include at least one of the fluid level and the fluid temperature.

3. The fluid sensor system of claim 1, wherein the control system is configured to determine the fluid level based on the fluid temperature and predetermined information that correlates a given resistance and a given temperature with a given fluid level.

4. The fluid sensor system of claim 1, wherein the probe further comprises an ambient temperature sensor to measure the ambient temperature, wherein the ambient temperature sensor is disposed at a portion of the probe that is away from the fluid.

5. The fluid sensor system of claim 4, wherein the ambient temperature sensor is a thermocouple.

6. The fluid sensor system of claim 1, wherein the probe further comprises a resistance temperature detector (RTD), and at least one of the resistive heating element and the fluid temperature sensor is connected to the RTD.

7. The fluid sensor system of claim 1, wherein the probe further comprises a four wire resistance temperature detector (RTD), wherein a first loop wire having a high temperature coefficient resistance (TCR) is connected to the RTD to form the resistive heating element and a second loop wire is connected to the RTD to form the fluid temperature sensor.

8. The fluid sensor system of claim 1, wherein the probe further comprises a limit sensor for detecting a maximum fluid temperature.

9. The fluid sensor system of claim 1, wherein the fluid temperature sensor is a thermocouple.

10. A fluid sensor system for a heating system, the sensor system comprising:

a probe having a finite length a portion of which is immersed in a fluid, the probe comprising a resistive heating element to detect the fluid and a fluid temperature sensor to measure a fluid temperature, wherein the resistive heating element is operable as a heater to create a temperature differential along the length of the probe to detect the fluid, and wherein the resistive heating element is operable to measure a fluid level; and a control system configured to determine one or more performance characteristics of the heating system based on at least one of an electrical response from the resistive heating element operating as a sensor and an electrical response of the fluid temperature sensor, and on predetermined information, wherein the control system is configured to operate the resistive heating element as the heater in response to the fluid temperature being substantially same as an ambient temperature, wherein the control system is configured to apply at least one of:

a first power amount to the resistive heating element to generate the temperature differential when the fluid temperature is substantially the same as the ambient temperature, and a second power amount less than the first power amount to the resistive heating element to measure a resistance of the resistive heating element when the fluid temperature is different from the ambient temperature.

11. The fluid sensor system of claim 10, wherein the control system is configured to determine the fluid level, as a performance characteristic, based on the fluid temperature determined based on the electrical response of the fluid temperature sensor, the resistance of the resistive heating element, and predetermined information that correlates a given resistance and a given fluid temperature with a given fluid level.

12. The fluid sensor system of claim 10, wherein the probe further comprises an ambient temperature sensor to measure the ambient temperature.

13. The fluid sensor system of claim 10, wherein the probe further comprises a resistance temperature detector (RTD), and at least one of the resistive heating element and the fluid temperature sensor is connected to the RTD.

14. The fluid sensor system of claim 10, wherein the probe further comprises a limit sensor for detecting a maximum fluid temperature, and the control system is configured to measure the fluid temperature based on an electrical response of the limit sensor and determine whether the fluid temperature is above a predefined limit.

15. A heater system comprising:
the sensor system of claim 10;
a heater operable to heat the fluid; and
a heater control system in communication with the control system of the sensor system, and configured to control the heater based on the performance characteristics.

16. A heater system comprising:

an integrated heater device comprising at least one multiportion resistive element, the at least one multiportion resistive element having a first portion defined by a first conductive material and a second portion defined by a second conductive material having a lower temperature coefficient of resistance (TCR) than that of the first conductive material, wherein the multiportion resistive element is operable as a heater to generate heat and as a sensor for measuring a fluid temperature, and wherein the first portion of the multiportion resistive element is configured to extend along a designated area to measure one or more performance characteristics; and a control system configured to operate the multiportion resistive element to measure an electrical response of the multiportion resistive element, wherein the control system is configured to:

determine the one or more performance characteristics of the heating system based on the electrical response;

apply a first power amount to the multiportion resistive element when the fluid temperature is substantially the same as an ambient temperature and when the integrated heater device is operable as the heater; and apply a second power amount less than the first power amount to measure resistance of the multiportion resistive heating element when the fluid temperature is different from the ambient temperature and when the integrated heater device is operable as the sensor.

17. The heater system of claim 16 further comprising a first member and a second member having a different Seebeck coefficient than that of the first member, wherein the first member and the second member form a temperature sensing junction to measure a temperature at a first location as a second performance characteristic.

* * * * *